United States Patent [19]

Yamaguchi et al.

[11] 4,332,002

[45] May 25, 1982

[54] FUSE BLOCK COVER

[75] Inventors: Noboru Yamaguchi, Yokosuka; Hideaki Wakasugi, Yokohama, both of Japan

[73] Assignee: Nissan Motor Company, Limited, Yokohama, Japan

[21] Appl. No.: 154,957

[22] Filed: May 30, 1980

[30] Foreign Application Priority Data

Jun. 15, 1979 [JP] Japan ............................ 54-81015[U]

[51] Int. Cl.[3] ............................................... H02B 1/18

[52] U.S. Cl. .................................... 361/432; 337/196; 337/212; 339/45 R

[58] Field of Search ............. 339/45 R; 337/194, 195, 337/196, 211, 212; 361/349, 357, 360, 430, 432

[56] References Cited

U.S. PATENT DOCUMENTS 945,017 1/1910 Cole .................................... 361/432

FOREIGN PATENT DOCUMENTS 723664 4/1932 France ................................ 361/432

*Primary Examiner*—Gerald P. Tolin

[57] ABSTRACT

A fuse block cover of a fuse block for plug-in type fuses is integrally formed with fuse detaching means consisting of a T-shaped groove adapted to be engaged with a head flange of a fuse without any interference with adjacent fuses arranged in a row in the fuse block, thereby facilitating the removal of the fuse from the fuse block without using any special removing tool.

3 Claims, 3 Drawing Figures

FUSE BLOCK COVER

BACKGROUND OF THE INVENTION

1. Field of the Invention

The present invention relates to a fuse block, more particularly to a fuse block cover provided with fuse detaching means.

2. Description of the Prior Art

Hitherto used fuses are generally enclosed in respective glass tubes each having at its ends conductors fitted thereon and terminals of a fuse block are arranged above a surface of a base of the fuse block, so that any one of the fuses is manually removed from the fuse block with ease without using any jig or special tool. Recently, the fuses used for automobiles, railroads, machines and the like have been greatly increased and therefore as the result of the investigation on size and robustness of fuses, smaller and more durable plug-in type fuses have been developed and widely used. The plug-in type fuses are available under the trade name "AUTO-FUSE". Such plug-in type fuses are so firmly held in a fuse block, that manual removal of them from the fuse block is rather difficult and requires a particular tool adapted to be attached to an inner side of a fuse block cover.

With this arrangement of the fuse block accommodating the plug-in type fuses, the tool should be housed inside of the fuse block and an operator must take care of the tool so as not to lose it.

SUMMARY OF THE INVENTION

It is an object of the invention to provide a fuse block which eliminates the above disadvantages of the prior art.

It is another object of the invention to provide a fuse block cover integrally formed with fuse detaching means thereon, which is inexpensive and does not require particular precaution against the loss of a tool for removing fuses.

The invention will be more fully understood by referring to the following detailed specification and claims taken in connection with the appended drawings.

DETAILED DESCRIPTION OF THE PREFERRED EMBODIMENTS

Figure 1:
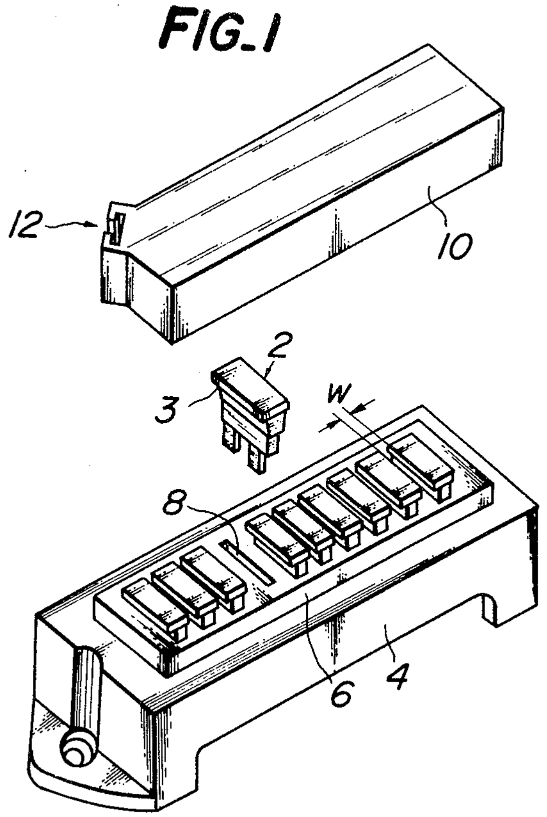
FIG. 1 is an exploded perspective view of a fuse block according to the invention.

Referring to FIG. 1 illustrating a preferred embodiment of the invention, a fuse box according to the invention comprises a plurality of plug-in type fuses 2, each having at its head a flange 3, a fuse block 4 in which a number of the fuses are concentrically arranged, a base 6 provided on the upper surface of the fuse block and formed with openings 8 for fitting therein the fuses, and a fuse block cover 10 adapted to be fitted on the side faces of the base 6 for covering and guarding the fuses 2 and formed in one edge with fuse detaching means 12.

Figure 2:
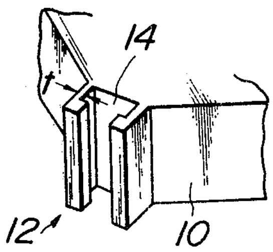
FIG. 2 is a partial enlarged perspective view showing fuse detaching means according to the invention.

FIG. 2 illustrates the fuse detaching means 12 in detail, wherein the means consists of a T-shaped groove 14 formed along and (not exclusively) passing through one edge of the fuse block cover 10.

Figure 3:
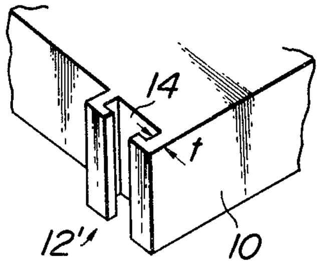
FIG. 3 is a partial enlarged perspective view showing another embodiment of fuse detaching means according to the invention.

Referring to FIG. 3, fuse detaching means 12' consisting of a T-shaped groove 14 similar to that shown in FIG. 2 is provided at one end of a surface of the fuse block cover 10 in the plane thereof. The thickness t of walls defining the T-shaped groove is less than the clearance W between the fuses 2 spaced and secured in a row in the fuse block 4, thereby enabling the T-shaped groove 14 to receive therein the flange 3 of the head of one of the fuses 2 arranged in a row in the fuse block 6.

How to use the fuse block cover according to the invention will be explained hereinafter. Under a normal condition, the fuses 2 are continuously located in the fuse block 4 on which the cover 10 is fitted on the base 6. When it is required to remove one of fuses for maintenance and inspection, the fuse cover block 10 is first removed from the fuse block 4 to expose the fuses so as to find a wrong fuse among them. By moving the fuse block cover 10 relative to the fuse block 4, the flange of the head of the wrong fuse 2 is inserted into the T-shaped groove 14 of the fuse detaching means 12 or 12' provided in the fuse block cover 10 in a direction at right angles to the lengthwise extension of the fuse block 4 or in a longitudinal direction of the fuse 2 as clearly shown in FIG. 1. After the flange 3 of the head of the fuse 2 and fuse detaching means 12 or 12' have been completely engaged in this manner, the fuse can easily be removed from the base 6 by moving the fuse block cover 10 utilizing the principle of the lever. If the fuse 2 is required to be exchanged, a new fuse having the same capacity as that of the removed fuse 2 is fitted in the position from which the wrong fuse 2 has been removed. If it is found that the old fuse 2 is not required to be changed, the fuse 2 may be again fitted in the original position. Finally, the fuse block cover 10 is fitted on the base 6 to guard the fuses 2.

In short, a part of the fuse block cover forms the fuse detaching means, thereby making easy the removal of fuses to provide a small type inexpensive fuse block. Moreover, it is advantageous that there is no possibility of losing a particular tool for removing the fuses as in the prior art.

While the invention has been particularly shown and described with reference to preferred embodiments thereof, it will be understood by those skilled in the art that the foregoing and other changes in form and details can be made therein without departing from the spirit and scope of the invention.

What is claimed is:

1. In combination: a fuse block body receiving therein fuses of plug-in type each having a flange at its head, and a fuse block cover for protecting the fuses, said fuse block cover being formed with means for engaging the flange of any one of the fuses in the body, said means comprising a groove having a substantially T-shaped cross-section thereby enabling removal from said fuse block of a fuse whose flange has been inserted into said groove and engaged with said means.

2. The combination of claim 1, wherein said engaging means is formed along and passes through one edge of said fuse block cover.

3. The combination of claim 1, wherein said engaging means is formed at one end of a surface of said fuse block cover in the plane thereof.

* * * * *